Patented Oct. 1, 1940

2,216,310

UNITED STATES PATENT OFFICE 2,216,310

COMPOSITION OF MATTER AND METHOD OF MANUFACTURING SAME

Charles M. Blair, Jr., Webster Groves, Mo., assignor to Petrolite Corporation, Ltd., Wilmington, Del., a corporation of Delaware No Drawing. Original application December 12, 1938, Serial No. 245,230. Divided and this application July 19, 1939, Serial No. 285,351

12 Claims. (Cl. 260—404)

This invention relates primarily to the treatment of emulsions of mineral oil and water, such as petroleum emulsions, for the purpose of separating the oil from the water, my present application being a division of my pending application Serial No. 245,230, filed December 12, 1938, which has since matured as U. S. Patent No. 2,171,328.

One object of my invention is to provide a new compound or composition of matter, that is particularly adapted for use as a demulsifier in the resolution of petroleum emulsions of the water-in-oil type, but which may have uses in other arts that I have not yet investigated.

Another object of my invention is to provide a novel method by which said new compound or composition of matter can be produced or manufactured, easily and economically.

The new compound or composition of matter which constitutes one feature of my present invention, consists of a certain kind of hydroxylated amino polymeric sub-resinous material of the kind derivable hypothetically by esterification reaction between (A) a neutral hydroxylated body containing at least one detergent-forming acid radical; a polyhydric alcohol radical; and at least two hydroxyl radicals; and (B) a substituted amino succinic acid characterized by the fact that at least one amino hydrogen atom has been replaced by a hydroxy hydrocarbon radical. Needless to say, homologues of amino succinic acid may be considered suitable; for instance, the corresponding amino derivatives of methyl succinic acid, ethyl succinic acid, hexyl succinic acid, benzyl succinic acid, etc.

It is well known that certain monocarboxy organic acids containing approximately eight carbon atoms or more, and not more than 32 carbon atoms, are characterized by the fact that they combine with alkalis to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids; for instance, instead of fatty acids, one might employ the chlorinated fatty acids. Instead of the resin acids, one might employ the hydrogenated resin acids. Instead of naphthenic acids, one might employ brominated naphthenic acids, etc.

Included among the various polyhydric alcohols which may be employed in the manufacture of the compounds contemplated herein are the following: glycerol, diglycerol, triglycerol, tetraglycerol, various glycols, and polyglycols; or polyhydric ether type materials derived by combination of both glycol and glycerol radicals; or derivatives of glycerol and polyglycerols with monohydric alcohols; substituted glycerols, such as methyl glycerol, ethyl glycerol, etc.

Among the various glycols are: ethylene glycol, diethylene glycol, triethylene glycol, ethylene propylene diglycol, and various other polyglycols, as well as glycols of the general formula $C_nH_{2n}(OH)_2$, in which $n$ may represent a number as large as 10. In many instances materials such as ethylene oxide, glycide, glycerol chlorhydrin, etc., will act in the same manner as the corresponding polyhydric alcohol. Such materials are the obvious functional equivalent of the polyhydric alcohols, and may be used if desired, although generally speaking, their cost in contrast with the polyhydric alcohols precludes their utilization. In other instances there are available certain naturally-occurring combinations of detergent-forming acids and polyhydric alcohols which can be employed without further reaction, as, for instance, triricinolein, which constitutes about 85 to 90 percent of ordinary castor oil.

It is well known that there is available, or that one can readily prepare, substituted succinic acids, or substituted homologues or isologues of succinic acid, which may be indicated by the following formula:

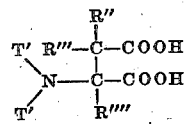

in which R″, R‴, or R″″ represents a hydrogen atom or a monovalent hydrocarbon radical, such as an alkyl radical, an alkyl-oxy-alkyl radical, an alicyclic radical, an aryl radical, an aralkyl radical, etc., at least one occurrence of T′ represents a hydroxy hydrocarbon radical, such as a hydroxy-alkyl radical, a hydroxyl alicyclic radical, an aryl hydroxy alkyl radical, a hydroxy alkyl radical interrupted at least once by an oxygen atom, etc., and the other occurrence of T′ may be the same, or may be a hydrogen atom or a hydrocarbon radical, such as an alkyl radical, an alkyl radical interrupted at least once by an oxygen atom, an alicyclic radical, an aryl substituted alkyl radical, etc., but does not represent an aryl radical.

As has been previously indicated, one of the reactants employed is a derivative of a polyhydric alcohol and a detergent-forming acid. Obviously, the two or more chemical compounds which produce such reactant may be used separately instead of the final compound itself. However, for the sake of clarity, hydroxylated polyhydric alcohol detergent-forming acid bodies, that is, materials of the kind previously referred to, will be described in detail. Such esters are considered as being multi-active, because such compounds must contain at least two alcoholic hydroxyl radicals, and can combine with a dibasic carboxy acid, such as a substituted amino succinic acid at at least two different points of reaction.

One class of multi-reactive materials includes triricinolein, trihydroxystearin, ethylene glycol diricinoleate, ethylene glycol dihydroxy stearate, ethylene glycol di-oxynaphthenate, ethylene glycol di-oxyabietate, etc. A second class of multi-reactive compounds consists of derivatives, in which there is no alcoholic hydroxyl radical attached to the detergent-forming acid radical, but in which there are at least two hydroxyls attached to the parent polyhydric alcohol radicals. Examples include mono-olein, mono-stearin, mono-abietin, mono-naphthenin, and similar derivatives derived from the polyglycerols, such as diglycerol, triglycerol, etc.

A third class of materials includes those in which there is at least one alcoholic hydroxyl radical attached to a detergent-forming acid radical, and at least one hydroxyl radical attached to the parent polyhydric alcohol residue. This class includes materials, such as monoricinolein, diricinolein, monohydroxystearin, dihydroxystearin, monohydroxy abietin, mono-oxynaphthenin, etc., including derivatives obtained from the glycols, polyglycols, polyglycerols, etc.

Simple consideration indicates that one might have various kinds of mixed esters; for instance, one mole of glycerol might be esterified with one mole of ricinoleic acid and one mole of oleic acid, or one mole of abietic acid and one mole of naphthenic acid. Similarly, diglycerol might be esterified with one mole of stearic acid and one mole of oleic acid, or with one mole of palmitic acid and one mole of abietic acid, or with one mole of abietic acid and one mole of naphthenic acid. A large number of similar combinations immediately suggest themselves.

The multi-reactive esters of the kind referred to may be indicated by the following formula:

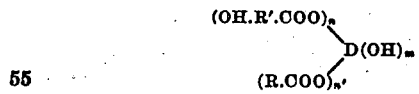

in which R.COO represents the oxy-acyl radical or acid radical of a monobasic carboxy detergent-forming acid; OH.R'.COO represents the same derived from a hydroxylated monobasic carboxy detergent-forming acid; and D represents a member of the class consisting of hydrocarbon radicals and ether-type oxyhydrocarbon radicals, in which the carbon atom chain is interrupted at least once by an oxygen atom; $n$ represents 0, 1, 2, 3, 4, 5, or 6; $n'$ represents 0, 1, 2, 3, or 4; $m$ represents 0, 1, 2, 3, 4, or 5, with the proviso that $n+n'$ must be at least one and not over 6, and that $m+n$ must be at least 2. It is to be noted that OH.R'.COO represents a hydroxylated detergent-forming acid and is intended to include the particular species in which more than one hydroxyl is included, such as dihydroxystearic acid, etc. Dihydroxystearic acid is the obvious equivalent of ricinoleic acid or hydroxystearic acid, as has been previously pointed out, and is to be so construed, of course, in all subsequent formulas and in the claims.

If, for the sake of convenience, hydroxylated substituted amino acids of the kind previously described are indicated by the formula:

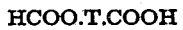

in which T represents that part or radical of certain substituted succinic acids or the like other than the carboxylic radicals, and which acids have been described completely in the first formula appearing in the present specification then the simplest esterification reaction product derived from multi-reactive esters of the kind described above may be indicated by the following formula:

It is to be noted that the product above indicated is a monomer and characterized by the presence of a free carboxyl and a free hydroxyl radical, insofar that only one molecule of water has been eliminated. Two such monomers may be indicated in the following manner:

If, however, a third molecule of water would be eliminated from the same two monomers, it would mean two monomers have joined to produce a dimer or a polymer. As far as the present invention is concerned, it is limited solely to polymeric forms, i. e., dimers and higher forms, which are described in greater detail subsequently, except to the extent that certain hereto attached claims contemplate the crude material of final reaction, which may, and undoubtedly does, contain at least a limited minor portion of monomers.

It has been previously pointed out that a material such as tetraglycerol may be employed. Tetraglycerol is characterized by six alcoholic hydroxyl radicals. Therefore, theoretically, at least, one mole of tetraglycerol could be united with six moles of ricinoleic acid; and one mole of the ester so formed could be united with six moles of a dicarboxy acid. Similarly, any dicarboxy acid could combine with at least two moles of a compound containing a free hydroxyl radical, and for these reasons it is obvious that the polymeric materials contemplated herein are not limited to those obtained as a result of equi-molar reactions, but that the formula above described may be advantageously rewritten as follows:

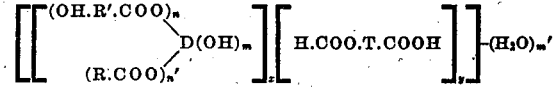

For the moment, no attempt will be made to define $x$, $y$, and $m'$ until consideration is given to their probable order of magnitude. In view of what has been stated by Kienle, Industrial & Engineering Chemistry, volume 22, No. 6, p. 590, and elaborated by subsequent investigators, (see Ellis, Chemistry of Synthetic Resins, volume II, 1935, particularly chapters 41-49, inclusive), it is probable that $x$ cannot reasonably represent a number greater than 30. It has been previously pointed out that theoretically, at least, $y$ might become 6 times $x$; and therefore, $y$ is limited to 180. Theoretically, at least, $m'$ might also be as much as 360, since one molecule of water could be formed for each carboxyl hydrogen atom present. With these facts in mind in the above formula, $x$ will be designated as representing a numeral greater than one and not over 30; $y$ will be represented as designating a numeral greater than one and not greater than 180; and $m'$ will be indicated as being greater than two and not greater than 360, with the added proviso that the ratio of $x$ to $y$ must be within the limits of 1 to 6 and 2 to 1, respectively.

An examination of the above formula reveals that although it accurately portrays the composition of the polymeric compounds herein contemplated within certain minor limits hereinafter discussed, yet it does not represent a suitable method of manufacture, i. e., esterification of the multi-reactive ester with a suitable amino succinic acid, for the following reasons:

(a) It contemplates the use of an amino acid which may act in the manner of an inner salt, comparable, perhaps, to amino benzoic acid, and which would not be readily adapted to a reaction of the kind contemplated;

(b) Furthermore, since the particular amino acid employed is characterized by the presence of an alcoholic hydroxyl radical, lactone-like materials might be produced or polymerization might take place between various molecules of the hydroxyamino acid;

(c) In addition, since some of the amino acids would represent secondary amines, i. e., still have available an amino hydrogen atom, it is obvious that acylation might take place, which would be undesirable.

For these reasons, and for other reasons which are obvious, I have found it necessary to produce such sub-resinous compounds herein contemplated by a new and novel method.

In employing my particular method for the manufacture of such sub-resinous compounds of the kind described, I resort to the use of maleic anhydride or its obvious equivalent, such as maleic acid, fumaric acid, and in certain instances, half salts and half esters, such as sodium acid maleate, ethyl acid maleate, etc. It is well known that if esters of maleic acid are treated with primary or secondary amines, a saturation-aminolysis reaction takes place. This reaction may be indicated in its simplest aspect by reaction between ammonia and dioctyl maleate, indicated in the following manner:

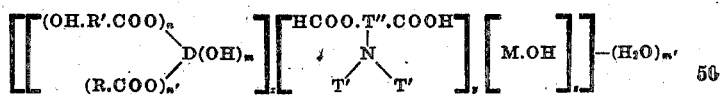

However, instead of using ammonia, if one employs a primary or secondary amine, in which there is a hydroxylated hydrocarbon radical as a substituent for an amino hydrogen atom, such as mono-ethanolamine, or other amines, as subsequently described, then one would obtain a derivative of a hydroxylated hydrocarbon substituted amino acid of the kind which has been previously described as being hypothetically derived from a substituted amino succinic acid. If, instead of octyl alcohol, one employed ethylene glycol mono-oleate, that is, a compound containing a polyhydric alcohol residue and also a detergent-forming acid residue, it would be obvious that the resultant product would be comparable to the materials previously described, except that such a product would represent a monomer.

It is at once obvious that a simple modification of such procedure will result in producing compounds of the type desired. For instance, if mono-olein or diricinolein, or any multi-active ester or reactant of the kind previously described in great detail above, is treated with maleic anhydride, a maleyl halide, or maleic acid or fumaric acid in the conventional manner to produce polymeric or sub-resinous materials, then the product so obtained, provided it is neutral or rendered neutral by any suitable means, i. e., neutralization with sodium hydroxide, potassium hydroxide, ammonium hydroxide, any tertiary amine, such as triamyline; or by esterification with monohydric or polyhydric alcohol, such as ethyl alcohol, butyl alcohol, propyl alcohol, octyl alcohol, octadecyl alcohol, or any of the polyhydric alcohols or ether alcohols previously described, can then be treated with a primary or secondary hydroxy hydrocarbon amine. The resultant product is a chemical compound, which is indicated by the formulas above referred to; with the exception that such formula has not incorporated therein the non-functional variations brought about by neutralizing any carboxylic hydrogen atom before the saturation-aminolysis reaction is involved. It is necessary to eliminate an acidic hydrogen atom contributed by an unneutralized carboxyl prior to the saturation-aminolysis reaction, because it would produce either one of a number of undesirable reactions, such as (a) waste the hydroxyamine employed; (b) unite, by an esterification reaction, with the hydroxy radical of the amine, which is undesirable; (c) produce acylation with the hydroxyamine, if an amino hydrogen atom is present, etc.

In view of what has been said, it is obvious that the previous formula can be rewritten in the following manner:

$$\left[\left[\begin{array}{c}(OH.R'.COO)_n \\ \diagup D(OH)_m \\ (R.COO)_{n'}\end{array}\right]\left[\begin{array}{c}HCOO.T''.COOH \\ \diagup N \\ T' \quad T'\end{array}\right]_z\left[M.OH\right]_q\right]-(H_2O)_{m'}$$

in which M.OH represents a suitable reactant for removing a carboxylic hydrogen atom, such as alkali hydroxide, a monohydric or polyhydric alcohol, or a tertiary amine, or the amine used for the saturation-aminolysis reaction. Examination reveals that $z$ should in no instance be greater than $\frac{1}{2} y$; and therefore, $z$ is momentarily indicated as being a number which varies from 0 to 90. At least one occurrence of T', as previously indicated, represents a hydroxylated hydrocarbon radical of the type $T'''(OH)_{m''}$, in which $T'''$ indicates a hydrocarbon radical; $m''$ indicates a small whole number not greater than 10; and the other occurrence of T' represents the same or a hydrogen atom or a hydrocarbon radical of the kind previously described.

It may be well at this point to indicate the various suitable amines which may be employed in the saturation-aminolysis reaction. Diethanolamine or monoethanolamine might be employed. Cyclohexylolamine or dicyclohexylolamine could be employed. Similarly, if one had available aralkylamines in which a hydrogen atom in the alkyl residue had been replaced by a hydroxyl radical, then such aryl alkylolamine would likewise be suitable. If the alkylolamines above described or their equivalents be considered as derivatives of glycols and hypothetically obtained by reacting the glycol chlorhydrin with ammonia, then similarly, it is obvious that various other amines, such as monoglycerylamine, diglycerylamine, etc., could be employed as well as amines obtained from ether alcohols, such as polyglycols or polyglycerols.

In the utilization of secondary amines, it is not necessary that both substituents for the amino hydrogen atoms be hydroxylated in character; for instance, ethyl ethanolamine, or ethyl propanolamine, or cyclohexyl ethylamine, or amyl glyceryl amine, and the like, may be employed. Compounds of the kind which comprise an integral part of the present invention are characterized by the presence of at least one hydroxy hydrocarbon radical replacing an amino hydrogen atom in the amino succinic acid radical or, residue. The expression "amino hydrocarbon" includes amino alkyl-oxy-alkyl residues, as well as those compounds in which the carbon atom chain is not interrupted by an oxygen atom. Incidentally, it has been found that the ether linkage of the type exemplified by morpholine is considered the equivalent of a hydroxy radical or grouping, and thus morpholine, although in essence a cyclic oxy-hydrocarbon amine, is considered as being a hydroxy hydrocarbon amine for the purpose of the reactions herein contemplated.

Other suitable amines which may be employed are the following: methyl ethanolamine, propanolamine, dipropanolamine, cyclohexyl ethanolamine, cyclohexyl propanolamine, benzyl ethanolamine, benzyl propanolamine, pentanolamine, hexanolamine, octyl ethanolamine, octadecyl ethanolamine, cyclohexanol ethanolamine, and polyethylene amines, such as the following:

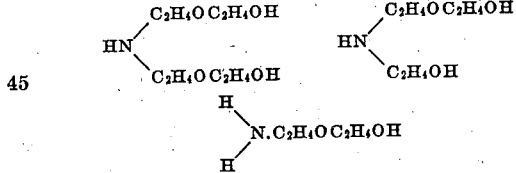

If one refers to the last formula previously employed to indicate the composition of the polybasic compounds herein contemplated, it is obvious that the amino nitrogen is still basic in character, and therefore, can be neutralized in the conventional manner with any suitable acid, if desired, such as hydrochloric acid, acetic acid, sulfuric acid, oleic acid, naphthenic acid, abietic acid, etc. Naturally, when such amine comes in contact with water, it combines to produce a substituted ammonium base. It is intended that all reference herein and in the hereto-appended claims, to the composition of matter contemplated, shall include the neutralized or basic form of material (combination with water), as well as the amine form. In order to avoid further complexity of formula, such obvious modifications will be ignored in designating the structure. What is said hereinafter as to the solubility of these compounds refers not only to the amines, but also to the salts and the reaction product obtained with water, to wit, the base.

An examination of the last formula above employed to indicate the polymeric products which constitute a feature of the present invention, reveals that the formula can be simplified and still suitably indicate the structure of the contemplated compounds. It is obvious that all the acidic hydrogen atoms of the substituted amino-succinic acid radical are removed by esterification, or secondary neutralization, as described. Therefore, in the final product the amino-succinic acid radical can be suitably indicated in the form of an oxy-acyl radical or OOC.T.COO. Bearing in mind that the multi-active constituent previously referred to must lose at least two hydroxyl radicals in order to form a polymeric compound (but may lose more than two), it is obvious that the last formula for the polymer product previously referred to may be rewritten as follows:

in which R'COO represents the oxy-acyl acid radical obtained by dehydroxylation of a hydroxy detergent-forming acid; RCOO represents the acid radical or oxy-acyl radical of a non-hydroxy detergent-forming acid; D represents a member of the class consisting of hydrocarbon radicals and ether-type oxyhydrocarbon radicals, in which the carbon atom chain is interrupted at least once by an oxygen atom; T represents the hydroxy hydrocarbon substituted amino succinic acid radical, and Z represents an acidic hydrogen atom substituent; $n$ represents 0, 1, 2, 3, 4, 5, or 6; $n'$ represents 0, 1, 2, 3, or 4; $p$ represents 0, 1, 2, 3 or 4; $m$ represents the number of hydroxyl radicals directly attached to D prior to esterification; $x$ has the same significance as previously, to wit, a number greater than 1 and not over 30; $y$ has the same significance as previously, to wit, greater than 1 and not over 180; and the ratio of $x$ to $y$ is within the limits of 1 to 6 and 2 to 1, respectively, and as previously stated, $n+n'$ must equal at least one.

Possibly the above formula does recognize insignificant minor variations which are immaterial for practical purposes. For instance, in a polymer, it is possible that the end nuclei derived from a multi-reactive reactant are characterized by the fact that a minimum of two hydroxyls are not removed and only one is removed, although this is not true if a cyclic structure results. It is understood, of course, that the above formula contemplates that the terminal nuclei derived from the multi-active reactant might be characterized by the fact that the multi-reactant residue has lost only one hydroxyl. Similarly, once the compound is formed, Z might be re-converted into an acid hydrogen atom, as, for instance, when an excess of an acid such as HCl is added in salt formation, as above discussed. Rarely would Z be so re-converted, but it is intended that so obvious an equivalent be included in the hereto attached claims.

The products herein contemplated are referred to as soluble polymeric sub-resinous materials. The products are referred to as soluble, because within the order of magnitude in which they may be used in breaking oil field emulsions, to wit, 1 to 10,000 or 1 to 30,000, or thereabouts, the products in one or more of their various forms are soluble in crude oil or in water, or in both. The word "soluble" is used to indicate molecular solubility or colloidal solubility. These materials are referred to as being sub-resinous, because in view of the molecular size, as indicated by the values for $x$ and $y$, it appears that such materials do not reach a true resinous stage. This is indicated, furthermore, by solubility of the kind just referred to. True resins do not exhibit such solubility. It is not intended to infer that such multi-active reactants of the kind described could necessarily be polymerized with a dibasic carboxy acid to give resins. Many of such reactants, and perhaps all of them, if heated indefinitely prior to the saturation-aminolysis reaction, would not produce a true resin, for reasons which are well understood, and which have been stated by Kienle, previously referred to. In any event, the final product can be examined by the usual cryoscopic methods, or other suitable methods, and the molecular weight so determined considered as being the molecular weight of the product.

The materials employed should have a molecular weight of less than 100,000; and as far as I am able to determine, those coming within the molecular weight range of approximately 2,000, or 20,000 appear to be most desirable. Excessive molecular weights indicate that lower temperature of reaction or smaller time of reaction should be employed. If the product exhibits too low a molecular weight, the indicated requirements are for higher temperature or longer time of reaction, or both. Reference to reaction means reaction, of course, prior to aminolysis. The presence of an excessive number of hydroxyl radicals makes for higher molecular weights.

It is obvious that any method of manufacture, and particularly the method which I employ, may result in the formation of some limited minor amount of monomeric compounds, as well as polymeric sub-resinous compounds. As far as I know, there is no objection to the presence of a minor amount of monomeric material; and in fact, such monomeric materials may be helpful in promoting the solubility of the polymeric materials in oil or water. In order that it may be understood that I particularly contemplate the preferred product obtained by the specified method of manufacture outlined, which includes a certain amount of monomeric materials, and perhaps other valuable by-products, it has been deemed desirable to direct claims both to a composition of matter, as indicated by the structural formula above, and also a composition of matter produced by the particular method herein described, in order to include the admixture with these monomeric materials.

Attention is now directed to the actual method of manufacture which I employ. For the sake of convenience, hereafter the expression "alkyl" will be used in its broadest sense to include an alkyl-oxy-alkyl radical, i. e., an alkyl radical in which the carbon atom chain has been interrupted at least once by an oxygen atom. Reference will be made to maleic anhydride. As has previously been stated, substituted maleic anhydride, maleyl chloride, ethyl maleic anhydride, cyclohexyl maleic anhydride, benzyl maleic anhydride, phenyl maleic anhydride, etc., could be employed, if available.

My preferred reagents are derived from fatty acids, and more particularly, hydroxylated fatty acids. The specific reactants which I prefer to employ are superglycerinated fats derived from castor oil, or blown or drastically oxidized castor oil. I prefer to employ monoricinolein or diricinolein, or the equivalent product derived from blown castor oil by treatment with an excess of glycerol in the usual manner. A suitable composition of matter which is particularly adapted for use as a demulsifier in the resolution of petroleum emulsions of the water-in-oil type is prepared in the following manner:

One mole of diricinolein is treated with one mole of maleic anhydride for approximately three hours at 120° C. with constant stirring; and then for approximately two hours at about 190° C., with further stirring. The product is allowed to cool and is tested for absence of acidity. If it should show any acidity, due to the presence of an unesterified carboxyl radical, a small amount of glycerol is added and the mass reesterified for approximately 30 minutes to an hour until the product is neutral. It is then allowed to cool to room temperature, approximately 25° C., or thereabouts, and cautiously treated with one mole of ethanolamine. The saturation-aminolysis reaction, previously referred to, takes place with considerable vigor, and the temperature is carefully controlled so that it does not rise above 65–70° C. as a maximum.

As has been indicated, one must employ a basic amine characterized by a basicity comparable to that of ammonia or triethanolamine. Arylamines, i. e., amines in which an aryl group is directly attached to the amino nitrogen atom, cannot be employed. It is understood that in the claims all reference to maleic anhydride includes the various conventional equivalents which have been previously referred to.

Obviously, where an ester is produced with an excess of hydroxyl radicals, one could, if desired, add a certain amount of half ester of half salt derived from maleic acid, such as sodium hydrogen maleate, ethyl hydrogen maleate, etc., to complete or finish off the esterification reaction. Similarly, as has been suggested previously, instead of employing the multi-active reactant, one could employ the constituents or reactants and produce the same. For instance, instead of employing monoolein, one could employ a suitable mixture of glycerine and oleic acid, or, if desired, one could react the maleic anhydride or its equivalent with the selected polyhydric alcohol, such as glycerol, and then esterify such product with the selected detergent-forming acid, such as oleic acid, prior to aminolysis. However, it is found to be most satisfactory by far to employ the procedure described, in preparing the preferred reagent. If such procedure is followed, then one readily obtains a material which exhibits the desired solubility and the desired molecular weight to place it clearly within the polymeric sub-resinous range previously specified.

As to the manufacture of polymeric sub-resinous materials from maleic anhydride and the like and various multi-active reactants of the kind previously described, attention is directed to the previous references, to Kienle, Ellis, and also to the following seven United States Patents No. 1,976,602, Oct. 9, 1934, and No. 1,977,048, Oct. 16, 1934, Melvin De Groote et al.; Nos. 1,977,089 and 1,977,146, Oct. 16, 1934, No. 1,978,227, Oct. 23, 1934, No. 1,979,347, Nov. 6, 1934, and No. 2,000,717, May 7, 1935, C. H. M. Roberts.

These above cited patents are referred to, not because they teach the use of maleic acid or maleic anhydride exclusively, but because they teach the manufacture of various materials from polybasic acids; and a person skilled in the art can readily make the necessary changes so as to employ maleic acid or maleic anhydride, instead of phthalic acid, oxalic acid, and the like, and obtain polymeric sub-resinous materials of the kind herein contemplated.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the new material or composition of matter herein described may be admixed with one or more of the solvents customarily used in connection with conventional demulsifying agents. Moreover, said new material or composition of matter may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in water-soluble form, or in an oil-soluble form, or in a form exhibiting both oil and water solubility. It has been previously pointed out that the new material or composition of matter that constitutes my present invention is characterized by the fact that it is soluble within the limits of use, as previously indicated.

I desire to point out that the superiority of my new compound or composition of matter as a new demulsifier for crude oil emulsions, is based upon its ability to treat certain emulsions more advantageously and at a somewhat lower cost than is possible with other available demulsifiers, or conventional mixtures thereof. It is believed that the new material or composition of matter herein described will find comparatively limited application as a demulsifier, so far as the majority of oil field emulsions are concerned; but I have found that said material has commercial value, as it will economically break or resolve oil field emulsions in a number of cases which cannot be treated as easily or at so low a cost with the demulsifying agents heretofore available.

In using my new material or composition of matter to resolve "cut oil," "rolly oil," "emulsified oil," etc., a treating agent or demulsifying agent consisting of or comprising said new material is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

Having thus described my invention, what I claim as new and desire to secure by Letters Patent is:

1. A composition of matter, comprising a soluble polymeric sub-resinous product having a molecular weight of less than 100,000, and characterized by the formula type:

in which R' COO represents the acid or oxy-acyl radical obtained by dehydroxylation of a hydroxy detergent-forming acid; R.COO represents the acid or oxy-acyl radical of a non-hydroxy detergent-forming acid; D represents a member of the class consisting of hydrocarbon radicals and ether-type oxyhydrocarbon radicals in which the carbon atom chain is interrupted at least once by an oxygen atom; T represents the hydroxy hydrocarbon substituted amino succinic acid radical, and Z represents an acidic hydrogen atom substituent; $n$ represents 0, 1, 2, 3, 4, 5, or 6; $n'$ represents 0, 1, 2, 3, or 4, with the proviso that $n+n'$ must equal at least 1; $p$ represents 0, 1, 2, 3, or 4; $m$ represents the number of hydroxyl radicals directly attached to D prior to esterification; $x$ represents a number greater than 1 and not over 30; $y$ represents a number greater than 1 and not over 180; and the ratio of $x$ to $y$ is within the limits of 1 to 6 and 2 to 1, respectively.

2. A composition of matter, comprising a soluble polymeric sub-resinous product having a molecular weight within the range of 2,000 to 25,000, and characterized by the formula type:

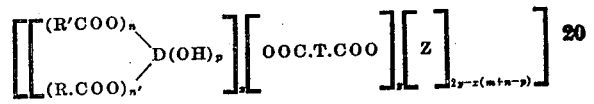

in which R'COO represents the acid or oxy-acyl radical obtained by dehydroxylation of a hydroxy detergent-forming acid; R.COO represents the acid or oxy-acyl radical of a non-hydroxy detergent-forming acid; D represents a member of the class consisting of hydrocarbon radicals and ether-type oxyhydrocarbon radicals in which the carbon atom chain is interrupted at least once by an oxygen atom; T represents the hydroxy hydrocarbon substituted amino succinic acid radical, and Z represents an acidic hydrogen atom substituent; $n$ represents 0, 1, 2, 3, 4, 5, or 6; $n'$ represents 0, 1, 2, 3, or 4, with the proviso that $n+n'$ must equal at least 1; $p$ represents 0, 1, 2, 3, or 4; $m$ represents the number of hydroxyl radicals directly attached to D prior to esterification; $x$ represents a number greater than 1 and not over 30; $y$ represents a number greater than 1 and not over 180; and the ratio of $x$ to $y$ is within the limits of 1 to 6 and 2 to 1, respectively.

3. A composition of matter, comprising a soluble polymeric sub-resinous product having a molecular weight within the range of 2,000 to 25,000, and characterized by the formula type:

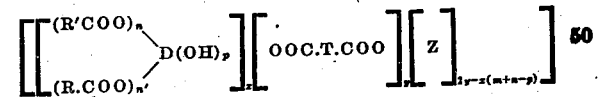

in which R'COO represents the acid or oxy-acyl radical obtained by dehydroxylation of a hydroxy fatty acid, R.COO represents the acid or oxy-acyl radical of a non-hydroxy fatty acid; D represents a member of the class consisting of hydrocarbon radicals and ether-type oxyhydrocarbon radicals in which the carbon atom chain is interrupted at least once by an oxygen atom; T represents the hydroxy hydrocarbon substituted amino sulfonic acid radical, and Z represents an acidic hydrogen atom substituent; $n$ represents 0, 1, 2, 3, 4, 5, or 6; $n'$ represents 0, 1, 2, 3, or 4, with the proviso that $n+n'$ must equal at least 1; $p$ represents 0, 1, 2, 3, or 4; $m$ represents the number of hydroxyl radicals directly attached to D prior to esterification; $x$ represents a number greater than 1 and not over 30; $y$ represents a number greater than 1 and not over 180; and the ratio of $x$ to $y$ is within the limits of 1 to 6, and 2 to 1, respectively.

4. A composition of matter, comprising a soluble polymeric sub-resinous product having a molecular weight within the range of 2,000 to 25,000, and characterized by the formula type:

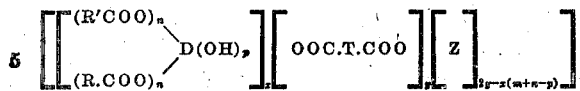

in which R'COO represents the acid or oxy-acyl radical obtained by dehydroxylation of a hydroxy fatty acid; R.COO represents the acid or oxy-acyl radical of a non-hydroxy fatty acid; D represents a member of the class consisting of hydrocarbon radicals and ether-type oxyhydrocarbon radicals in which the carbon atom chain is interrupted at least once by an oxygen atom; T represents the hydroxy hydrocarbon substituted amino succinic acid radical, and Z represents an acidic hydrogen atom substituent; $n$ represents 0, 1, 2, 3, 4, 5, or 6; $n'$ represents 0, 1, 2, 3 or 4, with the proviso that $n+n'$ must equal at least 1; $p$ represents 0, 1, 2, 3, or 4; $m$ represents the number of hydroxyl radicals directly attached to D prior to esterification; $x$ represents a number greater than 1 and not over 30; $y$ represents a number greater than 1 and not over 180; and the ratio of $x$ to $y$ is within the limits of 1 to 6 and 2 to 1, respectively; and additionally characterized by the fact that said composition of matter is derived solely from castor oil, glycerol, maleic anhydride, and an ethanolamine containing at least one amino hydrogen atom.

5. A composition of matter, comprising a soluble polymeric sub-resinous product having a molecular weight of less than 100,000, and obtained by subjecting a neutral polymeric sub-resinous product derived from maleic anhydride and a multi-active reactant of the formula type:

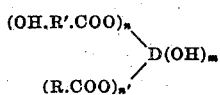

in which R.COO represents the acid or oxy-acyl radical of a monobasic carboxy detergent-forming acid; OH.R'.COO represents the same derived from a hydroxylated monobasic carboxy detergent-forming acid; D represents a member of the class consisting of hydrocarbon radicals and ether-type oxyhydrocarbon radicals in which the carbon atom chain is interrupted at least once by an oxygen atom; $n$ represents 0, 1, 2, 3, 4, 5, or 6; $n'$ represents 0, 1, 2, 3, or 4; $m$ represents 0, 1, 2, 3, 4, or 5, with the proviso that $n+n'$ must be at least one and not over 6 and that $m+n$ must be at least 2; to an aminolysis reaction with an amine, said amine being characterized by the presence of at least one amino hydrogen atom and by the presence of at least one hydroxy hydrocarbon radical, as a substituent for an amino hydrogen atom.

6. A composition of matter, comprising a soluble polymeric sub-resinous product having a molecular weight within the range of 2,000 to 25,000, and characterized by subjecting a neutral polymeric sub-resinous product derived from maleic anhydride and a multi-active reactant of the formula type:

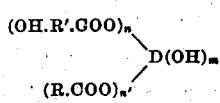

in which R.COO represents the acid or oxy-acyl radical of a monobasic carboxy detergent-forming acid; OH.R'.COO represents the same, derived from a hydroxylated monobasic carboxy detergent-forming acid; D represents a member of the class consisting of hydrocarbon radicals and ether-type oxyhydrocarbon radicals in which the carbon atom chain is interrupted at least once by an oxygen atom; $n$ represents 0, 1, 2, 3, 4, 5, or 6; $n'$ represents 0, 1, 2, 3, or 4; $m$ represents 0, 1, 2, 3, 4, or 5, with the proviso that $n+n'$ must be at least one and not over 6 and that $m+n$ must be at least 2; to an aminolysis reaction with an amine, said amine being characterized by the presence of at least one amino hydrogen atom and by the presence of at least one hydroxy hydrocarbon radical as a substituent for an amino hydrogen atom.

7. A composition of matter, comprising a soluble polymeric sub-resinous product having a molecular weight within the range of 2,000 to 25,000, and obtained by subjecting a neutral polymeric sub-resinous product derived from maleic anhydride and a multi-active reactant of the formula type:

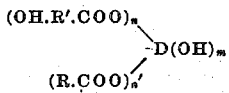

in which R.COO represents the acid or oxy-acyl radical of a fatty acid; OH.R'.COO represents the same, derived from a hydroxylated fatty acid; D represents a member of the class consisting of hydrocarbon radicals and ether-type oxyhydrocarbon radicals in which the carbon atom chain is interrupted at least once by an oxygen atom; $n$ represents 0, 1, 2, 3, 4, 5, or 6; $n'$ represents 0, 1, 2, 3, or 4; $m$ represents 0, 1, 2, 3, 4, or 5, with the proviso that $n+n'$ must be at least one and not over 6 and that $m+n$ must be at least 2; to an aminolysis reaction with an amine, said amine being characterized by the presence of at least one amino hydrogen atom and by the presence of at least one hydroxy hydrocarbon radical as a substituent for an amino hydrogen atom.

8. A composition of matter, comprising a soluble polymeric sub-resinous product having a molecular weight within the range of 2,000 to 25,000, and characterized by subjecting a neutral polymeric sub-resinous product derived from maleic anhydride and a multi-active reactant of the formula type:

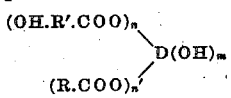

in which R.COO represents the acid or oxy-acyl radical of a fatty acid; OH.R'.COO represents the same, derived from a hydroxylated fatty acid; D represents a member of the class consisting of hydrocarbon radicals and ether-type oxyhydrocarbon radicals in which the carbon atom chain is interrupted at least once by an oxygen atom; $n$ represents 0, 1, 2, 3, 4, 5, or 6; $n'$ represents 0, 1, 2, 3, or 4; $m$ represents 0, 1, 2, 3, 4, or 5, with the proviso that $n+n'$ must be at least one and not over 6 and that $m+n$ must be at least 2; to an aminolysis reaction with an amine, said amine being characterized by the presence of at least one amino hydrogen atom and by the presence of at least one hydroxy hydrocarbon radical as a substituent for an amino hydrogen atom; and additionally characterized by the fact that said composition of matter is derived solely from castor oil, glycerol, maleic anhydride, and an ethanolamine containing at least one amino hydrogen atom.

9. A method for manufacturing soluble polymeric sub-resinous products having a molecular weight of less than 100,000, which comprises subjecting a neutral polymeric sub-resinous product derived by esterifying maleic anhydride with a multi-active reactant of the formula type:

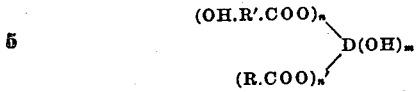

in which R.COO represents the acid or oxy-acyl radical of a monobasic carboxy detergent-forming acid; OH.R′.COO represents the same derived from a hydroxylated monobasic carboxy detergent-forming acid; D represents a member of the class consisting of hydrocarbon radicals and ether-type oxyhydrocarbon radicals in which the carbon atom chain is interrupted at least once by an oxygen atom; $n$ represents 0, 1, 2, 3, 4, 5, or 6; $n'$ represents 0, 1, 2, 3, or 4; $m$ represents 0, 1, 2, 3, 4, or 5; with the proviso that $n+n'$ must be at least one and not over 6 and that $m+n$ must be at least 2; to an aminolysis reaction with an amine, said amine being characterized by the presence of at least one amino hydrogen atom and by the presence of at least one hydroxy hydrocarbon radical as a substituent for an amino hydrogen atom.

10. A method for manufacturing soluble polymeric sub-resinous products having a molecular weight within the range of 2,000 to 25,000, which comprises subjecting a neutral polymeric sub-resinous product derived by esterifying maleic anhydride with a multi-active reactant of the formula type:

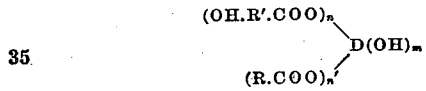

in which R.COO represents the acid or oxy-acyl radical of a monobasic carboxy detergent-forming acid; OH.R′.COO represents the same, derived from a hydroxylated monobasic carboxy detergent-forming acid; D represents a member of the class consisting of hydrocarbon radicals and ether-type oxyhydrocarbon radicals in which the carbon atom chain is interrupted at least once by an oxygen atom; $n$ represents 0, 1, 2, 3, 4, 5, or 6; $n'$ represents 0, 1, 2, 3, or 4; $m$ represents 0, 1, 2, 3, 4, or 5, with the proviso that $n+n'$ must be at least one and not over 6 and that $m+n$ must be at least 2; to an aminolysis reaction with an amine, said amine being characterized by the presence of at least one amino hydrogen atom and by the presence of at least one hydroxy hydrocarbon radical as a substituent for an amino hydrogen atom.

11. A method for manufacturing soluble polymeric sub-resinous products having a molecular weight within the range of 2,000 to 25,000, which comprises subjecting a neutral polymeric sub-resinous product derived by esterifying maleic anhydride with a multi-active reactant of the formula type:

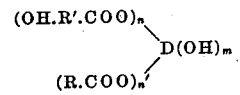

in which R.COO represents the acid or oxy-acyl radical of a fatty acid; OH.R′.COO represents the same, derived from a hydroxylated fatty acid; D represents a member of the class consisting of hydrocarbon radicals and ether-type oxyhydrocarbon radicals in which the carbon atom chain is interrupted at least once by an oxygen atom; $n$ represents 0, 1, 2, 3, 4, 5, or 6; $n'$ represents 0, 1, 2, 3, or 4; $m$ represents 0, 1, 2, 3, 4, or 5, with the proviso that $n+n'$ must be at least one and not over 6 and that $m+n$ must be at least 2; to an aminolysis reaction with an amine, said amine being characterized by the presence of at least one amino hydrogen atom and by the presence of at least one hydroxy hydrocarbon radical as a substituent for an amino hydrogen atom.

12. A method for manufacturing soluble polymeric sub-resinous products having a molecular weight within the range of 2,000 to 25,000, which comprises subjecting a neutral polymeric sub-resinous product derived by esterifying maleic anhydride with a multi-active reactant of the formula type:

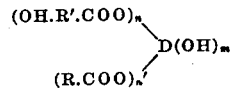

in which R.COO represents the acid or oxy-acyl radical of a fatty acid; OH.R′.COO represents the same derived from a hydroxylated fatty acid; D represents a member of the class consisting of hydrocarbon radicals and ether-type oxyhydrocarbon radicals in which the carbon atom chain is interrupted at least once by an oxygen atom; $n$ represents 0, 1, 2, 3, 4, 5, or 6; $n'$ represents 0, 1, 2, 3, or 4; $m$ represents 0, 1, 2, 3, 4, or 5, with the proviso that $n+n'$ must be at least one and not over 6 and that $m+n$ must be at least 2; to an aminolysis reaction with an amine, said amine being characterized by the presence of at least one amino hydrogen atom and by the presence of at least one hydroxy hydrocarbon radical as a substituent for an amino hydrogen atom; said method being additionally characterized by employing as sole raw materials, castor oil, glycerol, maleic anhydride, and an ethanolamine containing at least one amino hydrogen atom.

CHARLES M. BLAIR, Jr.